(12) United States Patent
Darr et al.

(10) Patent No.: US 7,698,170 B1
(45) Date of Patent: Apr. 13, 2010

(54) RETAIL RECOMMENDATION DOMAIN MODEL

(75) Inventors: Timothy P. Darr, Bristow, OK (US);
Thomas H. Dillon, Austin, TX (US);
Sherrill J. Packebush, Austin, TX (US);
Michael K. Grant, Austin, TX (US);
James Singh, Austin, TX (US); Jacob D. Leffler, Austin, TX (US); Jeremy S. Wacksman, Evanston, IL (US); Neil C. Thier, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 1651 days.

(21) Appl. No.: 10/912,743

(22) Filed: Aug. 5, 2004

(51) Int. Cl.
*G06Q 30/00* (2006.01)
(52) U.S. Cl. ............................................. 705/26
(58) Field of Classification Search ............... 705/26, 705/27
See application file for complete search history.

(56) References Cited

U.S. PATENT DOCUMENTS

| | | | |
|---|---|---|---|
| 5,877,966 A | 3/1999 | Morris et al. | 364/512 |
| 5,974,405 A | 10/1999 | McGuinness et al. | 706/45 |
| 6,412,012 B1* | 6/2002 | Bieganski et al. | 709/232 |
| 6,636,836 B1* | 10/2003 | Pyo | 705/26 |
| 6,836,773 B2* | 12/2004 | Tamayo et al. | 707/6 |
| 7,475,027 B2* | 1/2009 | Brand | 705/26 |
| 2003/0009456 A1 | 1/2003 | Shintani et al. | 707/6 |
| 2003/0023591 A1 | 1/2003 | Ma et al. | 707/6 |
| 2003/0208488 A1 | 11/2003 | Perrizo | 707/6 |
| 2003/0217055 A1 | 11/2003 | Lee et al. | 707/6 |
| 2003/0236785 A1 | 12/2003 | Shintani et al. | 707/6 |
| 2004/0049504 A1 | 3/2004 | Hellerstein et al. | 707/5 |
| 2008/0189253 A1* | 8/2008 | Oliver et al. | 707/3 |

OTHER PUBLICATIONS

U.S. Appl. No. 10/099,404, filed Mar. 15, 2002, Darr et al.
R. Agrawal et al., "Mining Association Rules Between Sets of Items in Large Databases," Proceedings of ACM SIGMOND Int'l Conference on Management of Data, pp. 207-216 (1993).
J. Han et al., "Mining Frequent Patterns Without Candidate Generation," Proceedings of ACM SIGMOND Int'l Conference on Management of Data, pp. 1-12 (2000).
J. Han, et al., "Mining Frequent Patterns Without Candidate Generation," ftp://ftp.fas.sfu.ca/pub/cs/han/slides/almaden00/ppt.

(Continued)

*Primary Examiner*—Mila Airapetian
(74) *Attorney, Agent, or Firm*—Hamilton & Terrile, LLP; Michael Rocco Cannatti (57) ABSTRACT

A data processing system normalizes data sets (such as low-resolution transaction data) into high-resolution data sets by mapping generic information into attribute-based specific information that is stored in a database. By establishing a shared domain model for representing items in the recommendation context, catalog and quote history with common terms and concepts, a recommendation engine operating in the shared domain may process the attribute-based representations to make specific and relevant recommendations to the customer. In addition, when certain attribute values are normalized over time, recommendations derived from past order history can be intelligently applied to current orders. The normalized representation of elements in the shared domain may also be used to generate compelling selling point text for each recommendation that is specific to the marketing objectives of the seller and identifies the objectives of the buyer.

20 Claims, 5 Drawing Sheets

OTHER PUBLICATIONS

B. Goethals, "Surveys on Frequent Pattern Mining," HIIT Basic Research Unit, Department of Computer Science, University of Helsinki, Finland (2003).

"Association Rule Mining," COMP 290-90 Seminar, University of North Carolina at Chapel Hill, Fall 2003, http://www.cs.unc.edu/Courses/comp290-90-f03/associationrule1.pdf.

X. Shang, et al., "SQL Based Frequent Pattern Mining Without Candidate Generation" (Poster Abstract) ACM Symposium of Applied Computing, pp. 618-619 (Mar. 2004).

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec1.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec2.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec3.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec4.ppt.

X. Shang, et al., "SQL Based Frequent Pattern Mining With FP-Growth," Proc. 15th Int. Conference on Applications of Declarative Programming and Knowledge Management, Berlin, Germany, 2004 http://wwwiti.cs.uni-magdeburg.de/~geist/publications/inap2004.pdf.

S. Ranka, "Association Analysis Part 3," Computer and Information Science and Engineering, University of Florida, http://www.cise.ufl.edu/class/cis6930fa03dm/notes/dm4part3.pdf ("Fall 2003") (printed Dec. 22, 2004).

Z. Ras, "Association Rules," University of North Carolina—Charlotte, http://www.coe.uncc.edu/~ras/KDD-02/AssocRules.ppt ("Spring 2004") (printed Dec. 22, 2004).

\* cited by examiner

RETAIL RECOMMENDATION DOMAIN MODEL

BACKGROUND OF THE INVENTION

1. Field of the Invention

The present invention relates in general to the field of database analysis. In one aspect, the present invention relates to a system and method for generating purchase recommendations based on historical transaction data.

2. Description of the Related Art

Conventional sales practices often use sales or service representatives to assist in the customer's purchasing decisions by recommending particular products or features to the customer. An experienced sales or service representative will be able to recommend specific purchases by first taking into consideration the customer's stated preferences.

In addition, a vendor who sells computer systems to a variety of customers (e.g., individual home users interested in personal computers, businesses interested in client/server systems, etc.) must recommend an optimal configuration of computer features and/or related products to meet the customer's particular needs, where a "configuration" is a collection of constituent parts that comprise an end product or service, and a "product" may comprise one or more physical objects or one or more services or any combination of products and services. In this case, the recommendation of a particular system configuration may depend on the external needs of the customer, such that a recommended configuration has a certain amount of disk space storage, a certain number of disk drives, choice of monitor, and the like to meet the desired level of functionality or price/performance desired by the customer.

An experienced sales or service representative will also be able to recommend specific purchases by taking into consideration the historical purchasing patterns of other customers, such that a recommendation is based on historical transaction data indicating that, when other customers have purchased product or feature X, they also purchased product or feature Y (which would be recommended to the customer). Now that modern computers can assemble, record and analyze enormous amounts of data, historical transaction data can be collected and analyzed using data mining techniques to discover association relationships in a database by identifying frequently occurring patterns in the database. These association relationships or rules may be applied to extract useful information from large databases in a variety of fields, including selective marketing, market analysis and management applications (such as target marketing, customer relation management, market basket analysis, cross selling, market segmentation), risk analysis and management applications (such as forecasting, customer retention, improved underwriting, quality control, competitive analysis), fraud detection and management applications and other applications (such as text mining (news group, email, documents), stream data mining, web mining, DNA data analysis, etc.). Association rules have been applied to model and emulate consumer purchasing activities by describing how often items are purchased together. Typically, a rule consists of two conditions (e.g., antecedent and consequent) and is denoted as A$\Longrightarrow$C where A is the antecedent and C is the consequent. For example, an association rule, "laptop$\Longrightarrow$speaker (80%)," states that four out of five customers that bought a laptop computer also bought speakers.

Conventional data mining approaches use generic item descriptions, such as the SKU (stockable unit number) when identifying items or products in a transaction database. When these generic descriptions are used to identify frequent sets, the frequent sets are not large and power-set/rule generation is tractable. However, conventional data mining techniques using item data at the SKU (stockable unit number) level do not provide sufficient information to develop meaningful association rules for complex products. For example, if there are three transactions involving the purchase of a computer identified as "Desktop-SKU" with one of the transactions also involving the purchase of DVD disks, the product level of description used to identify the computer does not reveal that two of the computers did not include DVD drives, while the third computer (which was purchased with the DVD disks) did include a DVD drive. As this example demonstrates, this lack of granularity in the item description diminishes the quality of association rules that can be generated, resulting in limited pattern correlation.

The difficulty of making recommendations increases as the number and complexity of mined association rules increases, which in turn is caused by an increase in the number of services and/or products, where each service or product may itself comprise a number of constituent services and products. The complexity of recommending a suitable configuration grows further with the number of constituent parts, the external needs of the customer, and the internal needs of the parts when considered as a whole. To assist with managing this complexity, configuration systems have been developed to help automate the process of choosing a particular configuration for the customer. A typical configuration system is a software process that captures the nature of the product by specifying the constituent components of the product and the available choices to be made when selecting a suitable set of the components. Conventional configuration systems require substantial programming input to capture the domain of a vendor's end products which refers to the information required to create a useful model of the end product that is usually expressed in terms of the generic part descriptions, such as the SKU (stockable unit number), of the (constituent) parts, the relationships among these parts, the resources of the parts, user needs, and the like. There are a number of drawbacks associated with conventional configuration systems, including the expense of creating and maintaining such systems, the programming complexity of creating and updating such systems, the time required to create the system and to train employees, the inflexibility of such systems in terms of accommodating new parts or descriptions, and the incompatibility with other configuration systems.

As seen from the conventional approaches, a need exists for methods and/or apparatuses for improving the use of data mining techniques in generating recommendations. There is also a need for finer granularity in the generation of frequent sets to better discover meaningful patterns without imposing the cost of a combinatorial explosion of the data that must be examined. In addition, there is a need for methods and/or apparatuses for generating flexible association rules without requiring unwieldy candidate set generation, without requiring multiple database passes and without requiring additional time to generate association rules as the frequent set grows. Moreover, there is a need for an improved method and system for efficiently generating retail recommendations which reduces programming complexity and expense, which may be readily adapted to new parts or part descriptions, and/or which is compatible with different configuration systems. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for generating retail recommendations using a recommendation domain model whereby inputs (such as customer purchase or profile information, catalog information, part information and historical transaction information) are translated to a normalized representation which may be processed by a recommendation engine which selects a recommendation and generates a targeted selling point text for the recommendation. Thus, the recommendation domain model is a representation of the key concepts of a domain that support the creation of recommendations within that domain. By normalizing the catalog, cart and order history into a shared domain using common terms and concepts, the recommendations may be derived from past order history information and intelligently applied to current orders, even where the native data format or domain for the order history differs from the native data format or domain for the current order. The use of a recommendation domain model also enables a customer profile to be developed based on the normalized representation of the customer purchase or profile information, where the profile may be used to define a compelling selling point text for each recommendation that is specific to the marketing objectives of the seller and identifies the objectives of the buyer. In this context, a domain model includes knowledge about a domain that a relative expert in the field would possess, including but not limited to part groups, the attributes that describe the parts in the catalog, the functions that those parts perform, the relative performance and qualitative attribute values that describe the parts and industry standards and rules-of-thumb which constrain the possible recommendations. In accordance with an alternative embodiment, a recommendation message generator issues the recommendation message, taking into account the most-likely profiles and/or the most-attractive recommendations, given the contents of the current recommendation context. A statement of intent or usage may be included in the recommendation message based on the inferred profile.

The objects, advantages and other novel features of the present invention will be apparent from the following detailed description when read in conjunction with the appended claims and attached drawings.

DETAILED DESCRIPTION

An improved method and apparatus are described for generating effective recommendations using a shared domain model representation of attribute-based association rules and customer order information to create compelling selling point messages based on identified customer profiles. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
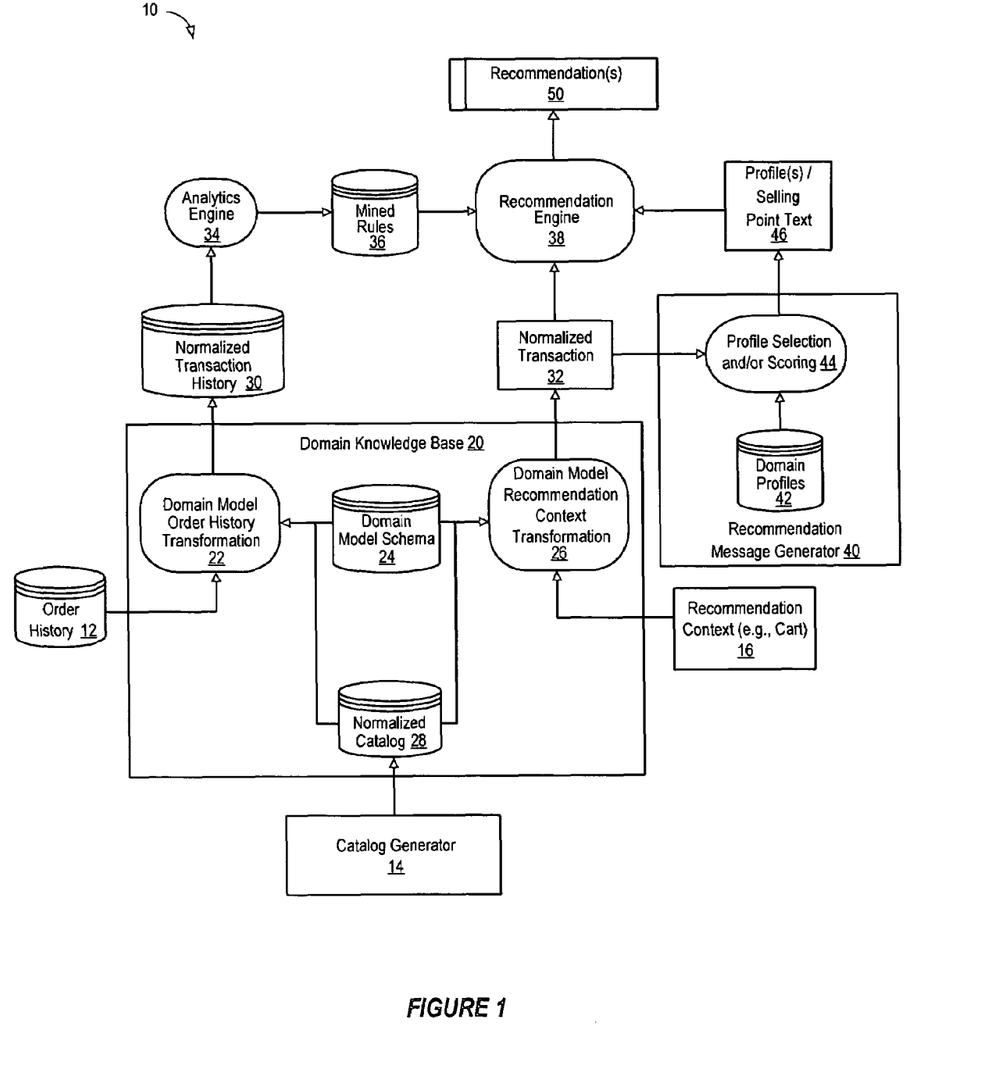
FIG. 1 illustrates an exemplary recommendation system for creating relevant and specific recommendations using high-resolution part and order history information that has been transformed into a normalized domain model representation.

Referring now to FIG. 1, a block diagram illustrates an exemplary recommendation system 10 for creating relevant and specific recommendations by mapping or otherwise transforming one or more input data sets of transaction information (e.g., order history information, catalog information and/or customer order-related information) into a second data set of transaction information (e.g., normalized transaction data) that provides more detailed information specifying the attributes of the purchased product. In a selected application, the second data set of transaction information may be used to generate cross-sell and up-sell recommendations based on frequent patterns mined from an order history store in a transaction database. By providing greater granularity to the transaction data, pattern correlation is improved by representing items in terms of their features so that a part or product may be represented in terms of its part group and various attribute-value pairs. For example, if there are three transactions involving the purchase of a computer with the third transaction also involving the purchase of DVD disks, by including an identification for each computer item of whether it includes a DVD drive (e.g., Computer.DVDrive.No for the first and second computers and Computer.DVDrive.Yes for the third computer), sufficient detail is provided to enable more accurate correlation between the computer and disk purchases when generating association rules. By transforming the input data set(s) to a shared or normalized representation, a common domain model or representation of the various input data sets is provided that can be used to generate one or more recommendations along with an associated selling point message.

In the example depicted in FIG. 1, the recommendation system 10 generates recommendations using a catalog generator 14, a domain knowledge base 20 for generating normalized transaction data 30, 32, an analytics engine 34 for generating mined rules 36, a recommendation message generator 40 and a recommendation engine 38 for generating recommendations 50 containing a sales message text 46. The catalog generator 14 is used to generate a normalized catalog 28, which represents the catalog of parts in the common domain of the recommendation system 10. The domain knowledge base 20 includes a domain model schema 24 and the normalized part catalog 28. In addition, transformation processes 22, 26 are included in the domain knowledge base 20 for transforming the order history 12 and recommendation context data 16 into the normalized transaction history 30 and normalized transaction 32, respectively. In addition or as an alternative to providing cart-related information, the recommendation context 16 can include valuable information outside of a cart, e.g., from a simple product page, a configuration page, or even a user's click-path/browse-path/user session history. These normalized representations 30, 32 are used to generate rules and appropriate selling point text that are processed by the recommendation engine 38 which issues the recommendation(s) 50. In particular, the recommendation message generator 40 uses the normalized transaction representation 32 as an input to the profile selection process 44 which selects a profile from the available domain profiles 42 and provides the selected profile and/or selling point text 46 to the recommendation engine 38. The recommendation engine 38 may then use the profile to select from among the mined rules 36 that match the normalized transaction data 32 and issue the selected rule as a recommendation 50 along with the appropriate selling point text.

In operation, the recommendation system 10 inspects the user's recommendation context 16 (such as items in a user's shopping cart, a product page being viewed by the customer on the web, a configuration page, an e-mail sent as part of a marketing campaign and/or the user's session history) and recommends additional up-sell or cross-sell items, thereby increasing some financial metric, such as the total order size and/or the profit margin of the order. In addition, the recommendation system 10 may determine what items to not recommend, such as when a recommended item has already been purchased. One approach for determining what item(s) to recommend is to analyze historical order history 12 and/or previous session histories (such as browse paths and click paths) for associations among previously purchased items. This approach is based on the idea that groupings of previously purchased items are a good predictor of what users are likely to buy in the future. As will be appreciated, the order history 12 may include the orders and/or abandoned carts over some period of interest. Another approach for determining what items to recommend involves using a known, self-selected customer profile that the user specifies when they register or login to a site. A third approach for determining what items to recommend is to use click-path or session information to infer what recommendations might be compelling for a given user.

To obtain more meaningful predictions from the order history 12 (which is typically referenced to generic product descriptors, such as the SKUs), the order history data 12 may be mapped or otherwise transformed into normalized transaction history data 30 that provides more detailed information identifying with greater specificity the attributes of the purchased products identified in the order history 12. The transformation module 22 performs the normalization by using the normalized catalog 28 and the domain model schema 24 to transform the native order history data 12 into a normalized transaction history 30. Data mining techniques may then be used to identify attribute-based associations contained in the normalized transaction history 30 and to generate rules 36 which the recommendation engine 38 selects from when determining what items to recommend, given a recommendation context 16. In particular, the analytics engine 34 generates attribute-based rules 36 using the normalized transaction history data 30 generated by the order history transformation module 22, and the mined rules 36 are used by the recommendation engine 38 to make recommendations to a user.

In similar fashion, the recommendation context inspection process uses normalized transaction data 32 that is generated by the domain model recommendation context transformation module 26, which receives as inputs the native recommendation context data 16, the normalized catalog 28, and the domain model schema 24, and generates a normalized transaction 32 as an output. As will be appreciated, the recommendation context data 16 may include the current product page/configuration, current quote or order under consideration by a user, as well as previously ordered items, viewed items or other session-related information from the customer. The normalized transaction data 32 may be used by a profile selection module 44 to select a profile that matches with the user. In addition, the normalized transaction data 32 is used by the recommendation engine 38 to recommend up-sell and cross-sell items to a user. In a selected embodiment, the same transformation process may be used to create the normalized transaction 32 and the normalized transaction history 30, so that the recommendation context data 16 and order history data 12 are both normalized using the domain model schema 24.

As for the operation of the recommendation message generator 40, the normalized transaction 32 and a set of domain profiles 42 are received as inputs and are used to determine a profile or user demographic for the user 46, given the recommendation context data 16. The returned profile 46 may also contain selling point text that will be used as part of the final recommendation 50. The selling text 46 may be profile driven, or may be based on the recommended product or part attributes as well as profile information, in some cases.

The recommendation engine 38 uses the normalized transaction 32, mined rules 36 and profile/selling point text 46 to select a rule that has a high probability of being accepted by the user, given the recommendation context data 16. The rule, in combination with the selling point text 46, defines the recommendation 50 which is presented to the user.

In accordance with the example of the present invention described herein, the domain model schema is used to transform the native recommendation context data and/or order history data into normalized representations that are used by the analytics engine and recommendation engine to generate recommendations. In this scheme, the domain knowledge base 20 may be considered to include a domain model schema component 24, a normalized part catalog component 28, and domain transformation components 22, 26 that transform native information from the recommendation context 16 and order history 12 into a normalized representation that is interpreted by the analytics engine 34 and recommendation engine 38. Each of these components is used to transform the native transaction data (from the recommendation context and order history) into a normalized and more detailed representation suitable for processing by the analytics and recommendation engines.

In particular, the domain model schema component 24 contains product detail knowledge (including definitions of part groups, features, functions, attributes and the like) that specifies various product feature details for each transaction item in the order history 12 and recommendation context 16, thereby providing all of the information needed in the recommendation domain that is relevant for recommendation decision-making. As will be appreciated, part group information refers to collections of parts with similar characteristics or functions, where parts may be considered to be the artifacts for sale, singly or in bundles, or that otherwise appear in a configuration. In addition, attributes are the properties for describing the parts within some context (such as the specifications of the part displayed on a web page), while functions are a description of the capability or usage of a part, such as the function of a part that has already been purchased and placed in the cart 16 or some other recommendation context that can be used in the recommendation process to eliminate recommendations that perform the same function. In effect, the domain model schema component 24 provides the knowledge that an expert in the field might use to identify relevant and specific recommendations; this is meant to reflect as closely as possible the true mental model and decision criteria of a customer. This correspondence between the schema and a customer mental model will greatly improve the relevance of recommendations. An example of such an expert would be a high-performing salesperson at a consumer electronics retail store, or a similarly skilled call-center employee at a consumer electronics OEM. For example, part number information for an item in the order history 12 may be mapped to a part group identifier and to a set of attribute names and values retrieved from the domain model schema component 24, and this transformed information may then be stored as normalized transaction data 30 in the database. In sum, the domain model schema component 24 is used to transform an order history 12 and the parts in the catalog currently for sale into a representation that can be used by an analytics or recommendation engine to create rules and recommendations. The domain model schema component 24 is also used to convert a recommendation context (such as a real-time order or cart selection) into a representation that can be used to select the appropriate recommendation(s). Because of the transformation aspect of the present invention, the domain model schema component 24 may or may not correspond to the seller's schema that is often used for other purposes, such as a configuration model or to display part information on a web page.

As an example of the benefit of having a domain model schema with a functional representation of a product, consider the representation of cell phone technology which has evolved rapidly in recent years. For example, it was uncommon a few years ago to find a cell phone that included a digital camera capability, whereas almost all current cell phones now include this capability. Another recently added cell phone feature is the PDA functionality which was only recently included as a cell phone feature. For purposes of simplifying the example, the purchasers of cell phones, digital cameras and PDAs are assumed to be most interested in the following characteristics:

Cell Phones—band (digital/analog/dual) and the type of screen (color/black-and-white), Digital Cameras—image resolution (2 MP, 4 MP, 5 MP), and PDAs—processor speed (in MHz) and memory (in MB).

Continuing with the example, there are, independent of the particular device (cell phone, digital camera, PDA), a set of functions that may be shared among devices. For example, consider the "Processing" function that describes the processing characteristics of a desktop, laptop, or PDA. This can be described using an XML representation as shown below:

<FunctionDefinition
functionName="Processing"
functionDescription="CPU/main processing functionality."
functionID="_Processing">
<FunctionalAttribute
attrName="Clock speed"
attrDescription="Processor clock speed"
attrID="_Processing._ClockSpeed"
attrType="numeric"/>
</FunctionDefinition>

As seen above, the XML element (FunctionDefinition) has attributes that describe the name and description of the function, as well as a unique identifier. This function also has a single attribute representing the processor speed, whose value is numeric. For completeness, other exemplary functions described above are shown below:

<FunctionDefinition
functionName="Memory"
functionDescription="Main memory for a computer or PDA."
functionID="_Memory">
<FunctionalAttribute
attrName="Memory size"
attrDescription="Memory size (in MB)"
attrID="_Memory._Size"
attrType="numeric"/>
</FunctionDefinition>
<FunctionDefinition
functionName="Digital Imaging"
functionDescription="Ability to capture digital images."
functionID="_DigitalImaging">
<FunctionalAttribute
attrName="Resolution"
attrDescription="Image resolution (in MegaPixels)"
attrID="_DigitalImaging._Resolution"
attrType="numeric"/>
</FunctionDefinition>
<FunctionDefinition
functionName="Telephony"
functionDescription="Telephone communications."
functionID="_Telephony">
<FunctionalAttribute
attrName="Band"
attrDescription="Communication band type"
attrID="_Telephony._Band"
attrType="{Digital|Analog|Dual}"/>
</FunctionDefinition>
<FunctionDefinition
functionName="Visual Display"
functionDescription="Visual display or monitor."
functionID="_VisualDisplay">
<FunctionalAttribute
attrName="ScreenType"
attrDescription="Type of screen (color, BW, etc.)"
attrID="_VisualDisplay._ScreenType"
attrType="{Color|Monochrome}"/>
</FunctionDefinition>

Continuing with the current example, there are three types of consumer electronics equipment: cell phones, digital cameras, or PDAs, some of which share the functions defined above. To represent this, a "part group" parameter is provided to define an arbitrary collection of parts. Each part group parameter may have a name, description, unique identifier and a list of functions that members of the part group can provide (though not every member of the part group must provide all the functions). An example of this is shown below for a cell phone:

```
<PartGroup
partGroupName="Cell Phone"
partGroupDescription="Any kind of cell phone."
partGroupID="_CellPhone">
<Function functionID="_Telephony"/>
<Function functionID="_VisualDisplay"/>
<Function functionID="_Processing"/>
<Function functionID="_Memory"/>
<Function functionID="_DigitalImaging"/>
</PartGroup>
```

For completeness, the other part groups described above are shown below:

```
<PartGroup
partGroupName="Digital Camera"
partGroupDescription="Any kind of digital camera."
partGroupID="_DigitalCamera">
<Function functionID="_VisualDisplay"/>
<Function functionID="_Memory"/>
<Function functionID="_DigitalImaging"/>
</PartGroup>
<Part Group
partGroupName="PDA"
partGroupDescription="Any PDA or handheld computer."
partGroupID="_PDA">
<Function functionID="_VisualDisplay"/>
<Function functionID="_Processing"/>
<Function functionID="_Memory"/>
</Part Group>
```

Finally, for individual members of a part group, a "part" parameter is provided having specific values for attributes that describe the part's characteristics. The following illustrates two cell phones (a basic cell phone and an advanced cell phone that is also a PDA) and a PDA. The basic cell phone is dual mode with a monochrome screen. The advanced cell phone is dual mode with a color screen, a 400 MHz PDA with 128 MB of memory and can take 2 MegaPixel digital pictures. The PDA has a 312 MHz processor and 64 MB of memory.

```
<Part
partGroupRef="_CellPhone"
partID="CELL-PHONE-001"
partDescription="Basic cell phone">
<Attr AttrRef="_Telephony._Band" Value="Dual"/>
<Attr AttrRef="_VisualDisplay._ScreenType" Value="Monochrome"/>
</Part>
<Part
partGroupRef="_CellPhone"
partID="CELL-PHONE-010"
partDescription="Advanced cell phone">
<Attr AttrRef="_Telephony._Band" Value="Dual"/>
<Attr AttrRef="_Processing._ClockSpeed" Value="400"/>
<Attr AttrRef="_Memory._Size" Value="128"/>
<Attr AttrRef="_DigitalImaging._Resolution" Value="2"/>
<Attr AttrRef="_VisualDisplay._ScreenType" Value="Color"/>
</Part>
<Part
partGroupRef="_PDA"
partID="PDA-001"
partDescription="Basic PDA">
<Attr AttrRef="_Processing._ClockSpeed" Value="312"/>
<Attr AttrRef="_Memory. Size" Value="64"/>
</Part>
```

Using the more detailed and normalized representation of parts to represent the parts in terms of the constituent functions, the recommendations may be generated independently of the individual SKUs or part numbers, which change very rapidly (known as "SKU churn"). This is advantageous because, for conventional manually-generated recommendations, SKU churn requires high maintenance overhead since the recommendations reference individual SKUs. As a result, SKU additions, deletions or modifications typically require updates to a high percentage of the recommendations. For conventional automatically-generated recommendations, SKU churn also requires high maintenance overhead as SKU additions, deletions or modifications typically require that the automatic recommendation generation step be repeated. With either type of conventional approach, as new SKUs are added and removed, the recommendations churn is at least as high as the SKU churn since the recommendations reference individual SKUs.

To remedy this, the normalized representation removes any references to SKUs in the recommendations and recommendation context, resulting in attribute-based recommendation matching that is independent of individual SKUs. This may be illustrated with the cell phone/PDA example. Before the introduction of multi-function cell phones, the order history at a consumer electronics retail store would show a strong association among those that bought cell phones and those that bought PDAs. For example, prior purchasers of the CELL-PHONE-001 device were highly likely to buy the PDA-001 device as well. By transforming these transactions using the domain model schema of the present invention, instead of representing the rule as an association between CELL-PHONE-001 and PDA-001, the rule associates cell phone attributes {_Telephony._Band=Dual, _VisualDisplay._ScreenType=Monochrome} with PDA attributes {_Processing._ClockSpeed=324, _Memory._ Size=64}. By removing the individual parts (SKUs), the recommendations are independent of the SKUs, meaning that new SKUs can be added without invalidating the recommendations. And by removing the part groups from the recommendations, new part groups can be added, or parts can be re-assigned to other part groups without invalidating the recommendations. In addition, new functions can be added to part groups without invalidating the recommendations. Thus, as SKUs are added or deleted, it does not necessarily mean that the recommendations need to be updated. This is especially important for automatic recommendation tasks as the order history and or catalog upon which the recommendations are based are converted to the attribute-based representation.

Figure 2:
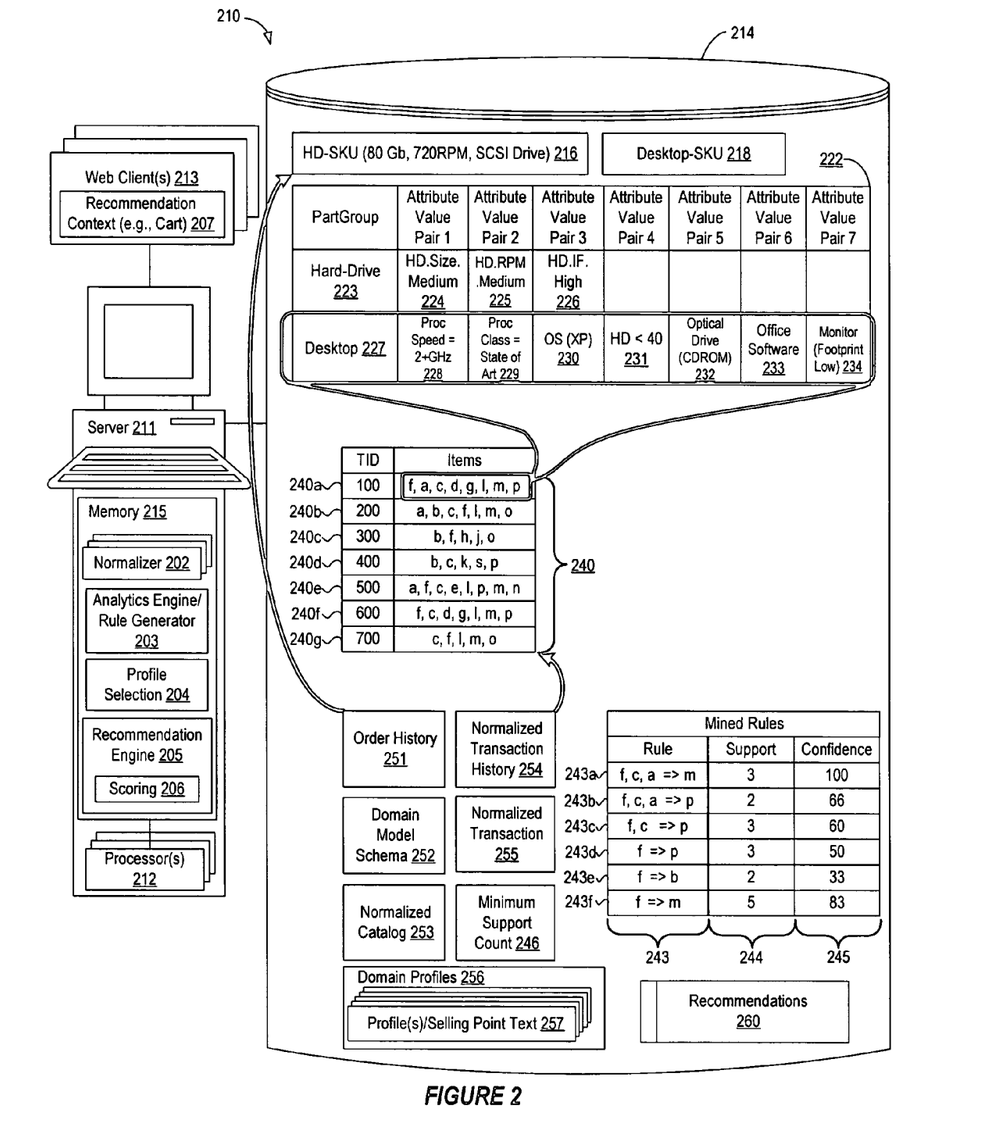
FIG. 2 illustrates a data processing system for generating recommendations using an exemplary computer parts domain knowledge base.

FIG. 2 illustrates a system for generating recommendations 260 using an exemplary computer parts domain knowledge base implemented with a data processing system 210 (e.g., a private wide area network (WAN) or the Internet) that includes a central server computer system 211 and one or more networked client or server computer systems 213 that are connected to the network. Communication between central server computer system 211 and the networked computer systems 213 typically occurs over a network, such as a public switched telephone network over asynchronous digital subscriber line (ADSL) telephone lines or high-bandwidth trunks, for example, communications channels providing T1 or OC3 service. Networked client computer systems (e.g., 213) typically access central server computer system 211 through a service provider, such as an internet service provider ("ISP") by executing application specific software, commonly referred to as a browser, on the networked client computer systems 213.

In a selected embodiment, a first data set of transaction information is stored in a database 214 that may be accessed directly or indirectly by the server 211. In this example, the first data set identifies the items included in one or more transactions (such as contained in the native order history 251) by including a generic product descriptor 216, 218 for each transaction item, such as the SKU (stockable unit number) for a purchased product. Thus, a hard drive that was purchased is identified with the hard drive SKU (stockable unit number) 216 and a desktop computer is identified with the desktop SKU 218. In addition or in the alternative, the first data set of transaction information identifies the recommendation context 207 associated with the user, such as items already purchased by the user and contained in the cart, product page information that is viewed by the user, configuration page data assembled by the user, a click path, a browse path, a current session history, previous session histories, or prior purchase records for the user.

In accordance with an embodiment of the present invention described herein, a transformation or normalizer process 202 maps or otherwise transforms the first data set of transaction information into a second data set of transaction information that provides more detailed information identifying with greater specificity the attributes of the specified product. As indicated, if only one of the input data sets (e.g., the cart data 207) requires normalization, then a single normalizer process 202 is used, but if the order history data 251 or the native catalog data (not shown) is normalized, then separate instances of the normalizer process 202 may be used. In a selected embodiment, the data transformation is implemented with a computer or other data processing functionality (e.g., server 211) which loads a copy of the first data set (e.g., 216, 218 from a database 214) into local memory (e.g., 215). As will be appreciated, the first data set may represent items from the customer cart 207 or other recommendation context data, or may represent items from prior transactions in the order history database 251. Using a product detail knowledge database (such as contained in the domain model schema 252) and/or the normalized catalog database 253 that specify various product feature details for each transaction item, the server 211 invokes the normalizer process 202 to map or transform the generic product descriptors of the first data set (e.g., 216, 218) into a second data set (e.g., 254) that specifies additional details and/or features for the item of interest, such as more detailed product descriptor information. In the depicted embodiment, part numbers in an order (e.g., 216, 218) may be mapped to a part group identifier and to a set of attribute names and values (e.g., 223, 227, respectively) and stored in the database 214. For example, an 80 Gb, 7200 RPM, SCSI drive identified with the HD-SKU 216 could be mapped to the following numerical, attribute-based transaction items:

_Hard_Drive
_Hard_Drive._Size. 80 Gb
_Hard_Drive._RPM. 7200
_Hard_Drive._Interface.SCSI These items are included in a second data set 222 (also identified in FIG. 2 as the normalized transaction history 254) as an entry 223-226 which quantifies the consumer preferences for one or more products and associated product features and which is organized or stored in a structured format, such as a database or table. In this example, the original item description 216 is now expanded and represented by a Part Group identifier 223 and three attribute items 224, 225, 226. In similar fashion, the original item description 218 for a desktop computer is expanded and represented by a Part Group identifier 227 and seven attribute items 228-234 (in this example) that are stored as an entry in the second data set 222. These additional attribute items 228-234 specify the processor speed 228, processor class 229, operating system type 230, hard drive size 231, optical drive type 232, software package type 233, and monitor type 234 for the desktop item.

Because of the additional product detail information contained in the second data set (e.g., normalized transaction history 254), it can be used in transaction database applications to provide more meaningful frequent pattern analysis that is performed by the analytics engine 203. A broad variety of efficient algorithms for mining association rules have been developed in recent years, including algorithms based on the level-wise Apriori framework, TreeProjection and FPGrowth techniques. For example, association rules may be generated from the expanded second data set of transaction information that is included as part of a transaction database 240 representing the normalized transaction history 254, as indicated with entries 240a-g in FIG. 2. An important consideration with data mining applications is the representation of the transaction database 240. Conceptually, such a database can be represented by a binary two-dimensional matrix in which every row (e.g., 240a) represents an individual transaction (with a transaction identifier (e.g., TID 100)) and the columns represent the items in the transaction (e.g., f, a, c, d, g, l, m, p). Such a matrix can be implemented in several ways. The most commonly used layout is the horizontal data layout. That is, each transaction has a transaction identifier and a list of items occurring in that transaction. Another commonly used layout is the vertical data layout, in which the database consists of a set of items, each followed by its cover.

In the example of FIG. 2, the server 211 begins the process of generating association rules 243 by retrieving the item descriptors from the normalized transaction database 240 and a minimum support count 246. The server 211 then identifies all items in the database 240 with a frequency meeting or exceeding the minimum support count requirement (e.g., the minimum support count is 3), and uses a rule generator 203 (depending on the rule generation algorithm used) to generate a plurality of association rules 243a-f. Each association rule has support and confidence metrics that are calculated by the server 211. For example, the support metric 244 is determined by the number of times the rule is supported in the transaction database 240, and the confidence metric 245 is determined by the percentage of times the antecedent of the rule leads to the consequent.

Once the association rules 243 are finalized (which may optionally include an optimization to remove redundant rules), the recommendation engine 205 is invoked to process the recommendation context information 207 generated by the user to identify potentially matching association rules to issue as recommendations 260. To this end, a normalizer process 202 may be executed to generate a normalized representation of the recommendation context 207 based on the domain model schema 252 and/or normalized catalog 253, which may be stored as a normalized transaction data set 255. The normalized transaction representation 255 may be used by the profile selection process 204 to select a profile and/or selling point text 257 from the available domain profiles 256 that most likely matches the profile of the user generating the recommendation context 207. The selected profile and/or selling point text 257 and/or potentially matching association rules may be ranked using a scoring process 206 to identify potentially matching rules to issue as recommendations 260.

Figure 3:
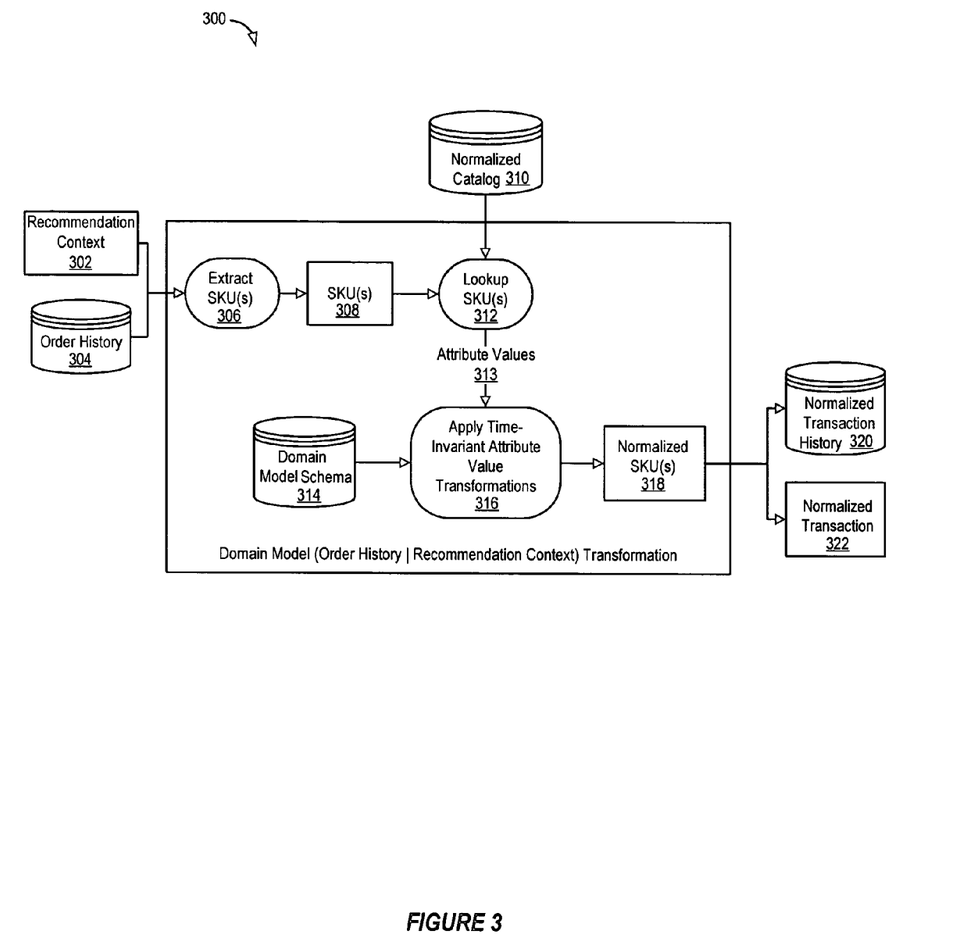
FIG. 3 illustrates an exemplary method and system for normalizing the order history and/or recommendation context.

In accordance with a selected embodiment of the present invention, the transformation of the native cart or order history data may use qualitative or time-variant attribute values to represent the normalized data. Such time-variant attribute values can be useful where the relevancy of recommendations, whether automatically or manually generated, can expire over time as new technologies appear or new products are offered. For example, a processor that was the highest performing in its class six months ago is no longer the highest performing in its class today. As a result, the recommendations generated six months ago may no longer be useful if the changes to the product offering and technology over time are not taken into account. Manual recommendation updates are burdensome in requiring, at one extreme, replacement of outdated recommendations with new, but similar, recommendations, and at the other extreme, modifying existing recommendations. To address this problem, the domain knowledge base (e.g., domain knowledge base 20 in FIG. 1) may also include a transformation process for adjusting the values of attributes in the normalized data sets 28, 30, 32 to account for the changing technologies and product offerings over time. Products that were "high performance" or products that were "state-of-the-art" at the time the recommendations were originally generated may be adjusted to "moderate performance" or "middle-of-the-road technology." For example, an 80 Gb, 7200 RPM, SCSI drive identified with the HD-SKU 216 could be mapped to the following qualitative, attribute-based transaction items:

_Hard_Drive
_Hard_Drive._Size. Medium
_Hard_Drive._RPM. Medium
_Hard_Drive._Interface.High In accordance with a selected embodiment, FIG. 3 depicts an alternative method and system 300 for normalizing the order history and/or cart data. The individual SKUs 308 are extracted 306 from the order history 304 or recommendation context data 302. A lookup 312 into the normalized part catalog 310 returns the attribute values 313 for the SKU. Using the domain model schema 314, certain attribute values may then be transformed 316 into a time-variant representation 318, resulting in a normalized representation 318 for the order history (normalized transaction history 320) or the recommendation context (normalized transaction 322). With this transformation, the attribute values in the catalog and recommendations can be updated as needed to accurately reflect the change in technology and product offerings over time. This transformation allows historical recommendations to remain relevant, even though the technology has changed.

The use of time-variant attribute values may be illustrated with reference to the cell phone/PDA example described herein by assuming that a rule was discovered finding a strong association between dual-mode, color screen, 2 MP digital camera-enabled cell phones and high-performance PDAs with the highest processor clock speed and largest RAM. If the PDAs are numerically represented in the normalized transaction history in terms of raw processor speed and memory attribute values, those PDAs that were "high performing" at the time the rule was discovered are no longer high performing when a faster processor speed PDA is introduced, thus invalidating the rule.

To remedy this, a general "performance" attribute is used to characterize PDAs, where the "performance" attribute can vary over time. This requires an update to the definition of the Processing function as shown below:

<FunctionDefinition
functionName="Processing"
functionDescription="CPU/main processing functionality."
functionID="_Processing">
<FunctionalAttribute
attrName="Performance"
attrDescription="Processor performance"
attrID="_Processing._Performance"
attrType="numeric"/>
<FunctionalAttribute
attrName="Clock speed"
attrDescription="Processor clock speed"
attrID="_Processing._ClockSpeed"
attrType="numeric"/>
</FunctionDefinition>

The "performance" attribute may be a combination of the PDA processor speed and RAM memory, such that PDAs with faster processors and larger memories are better performing than PDAs with slower processors and smaller memories. As will be appreciated, the "performance" attribute could also apply to laptops, desktops, etc., though the values would have to be scaled appropriately because a "high performance" desktop is not necessarily the same as a "high performance" PDA.

To convert from the clock speed and memory attributes to the new performance attribute (Processing.Performance) for the part, a translation table may be used, such as the example translation table shown below:

| Performance Attribute Value | Processor Clock Speed Range | Memory Size Range |
| --- | --- | --- |
| High | 400 MHz and above | 64 MB and above |
| Medium | 300-400 MHz | 32-64 MB |
| Low | 300 MHz and below | 32 MB and below |

For convenience, the definition of our PDA part parameter from before (PDA-001) is replicated below, with the new performance attribute included. In addition, another PDA (PDA-002) is shown for illustration purposes.
<Part
partGroupRef="_PDA"
partID="PDA-001"
partDescription="Basic PDA">
<Attr AttrRef="_Processing._ClockSpeed" Value="312"/>
<Attr AttrRef="_Memory._Size" Value="64"/>
<Attr AttrRef="_Processing._Performance" Value="Medium"/>
</Part>
<Part
partGroupRef="_PDA"
partID="PDA-002"
partDescription="Advanced PDA">
<Attr AttrRef="_Processing._ClockSpeed" Value="400"/>
<Attr AttrRef="_Memory._Size" Value="64"/>
<Attr AttrRef="_Processing._Performance" Value="High"/>
</Part>

Continuing with the example where a rule establishes a strong association between dual-mode, color screen, 2 MP digital camera-enabled cell phones and high-performance PDAs, if a user has a cell phone with those characteristics in the recommendation context, then the recommendation engine would recommend the second PDA (PDA-002), since it is the "high" performance PDA.

The use of qualitative representations in the normalized transaction data also provides a flexible update mechanism for adjusting to changes in technology over time. For example, if a new 624 MHz PDA with 128 MB memory is introduced to the market, this would signal a change in what constitutes a high-performance device. To accommodate this change, the translation table could be updated as shown below to reflect the current state-of-the-art technology:

| Performance Attribute Value | Processor Clock Speed Range | Memory Size Range |
| --- | --- | --- |
| High | 600 MHz and above | 128 MB and above |
| Medium | 350-600 MHz | 64-128 MB |
| Low | 350 MHz and below | 64 MB and below |

Using this new translation table, the normalized transaction data for the PDA offerings would be updated as shown below:
<Part
partGroupRef="_PDA"
partID="PDA-001"
partDescription="Basic PDA">
<Attr AttrRef="_Processing._ClockSpeed" Value="312"/>
<Attr AttrRef="_Memory._Size" Value="64"/>
<Attr AttrRef="_Processing._Performance" Value="Low"/>
</Part>
<Part
partGroupRef="_PDA"
partID="PDA-002"
partDescription="Advanced PDA">
<Attr AttrRef="_Processing._ClockSpeed" Value="400"/>
<Attr AttrRef="_Memory. Size" Value="64"/>
<Attr AttrRef="_Processing._Performance" Value="Medium"/>
</Part>
<Part
partGroupRef="_PDA"
partID="PDA-010"
partDescription="High-performance PDA">
<Attr AttrRef="_Processing._ClockSpeed" Value="624"/>
<Attr AttrRef="_Memory._Size" Value="128"/>
<Attr AttrRef="_Processing._Performance" Value="High"/>
</Part>

Note that the second PDA (PDA-002) is no longer "high" performance, but is now only a "medium" performance PDA device, and the first PDA (PDA-001) is now a "low" performance PDA device. The "high" performance PDA has been replaced by the third PDA (PDA-010). As a result, when the rule described above (establishing an association between dual-mode, color screen, 2 MP digital camera-enabled cell phones and high-performance PDAs) is applied to a user who has a cell phone with those characteristics in the recommendation context, then the recommendation engine would recommend the third PDA (PDA-010), since it is the new high-performance PDA.

In a selected embodiment, updates to the qualitative attribute values may be made by updating each of the mined rules. However, the attribute values may instead be updated by updating the attribute values of the parts in the normalized part catalog that is accessed by the recommendation engine. As a result, only the attribute values of the parts in the catalog are updated (which is a much less expensive operation), and the rules do not have to be updated (which is a very expensive operation).

In addition to accommodating changes in technology over time, the use of time-variant attribute values also reduces the processing requirements for generating association rules by reducing through consolidation the number of potential attributes to be processed. For example, all PDA devices having a processor speed below 300 MHz would be processed using a "low" performance attribute (assuming the memory size requirements were also met). Thus, because the complexity of the rule generation task is exponentially bounded by the number of attributes that describe the parts in the catalog or order history, rule generation complexity can be managed by carefully selecting the attributes to support recommendation decision-making.

As indicated above, a selected embodiment of the present invention enables new recommendations to be created when new parts are added or old parts are discontinued without disturbing the recommendation generation process, in contrast to conventional recommendation systems that have difficulty introducing new products into the recommendation system. In particular, the attribute-based representation of normalized transaction data allows new product information to be introduced into the recommendation domain model in a variety of ways. For example, for new parts within an existing part group, the new parts are translated into an attribute-based representation, taking into account time-variant attribute values, and the recommendation process proceeds as usual. In other words, new part introduction is seamlessly integrated into the recommendation process. Another technique for introducing new products is to use a statement that the new product is "like" an existing product, and to then translate this to the attribute-based representation and re-generate as usual.

In the extreme cases of new products that are sufficiently different from existing products, it may be necessary to "seed" the recommendations manually until an order history is developed to discover the recommendations automatically. Even in this extreme case, the benefits of an attribute-based representation apply.

Since the recommendation rules are expressed using the attribute-based representations, discontinued parts do not have any effect on the recommendation generation process. The previously identified recommendations are still valid, since they are independent of specific parts. Subsequent recommendations can be mined from the order history with or without the discontinued part(s).

Figure 4:
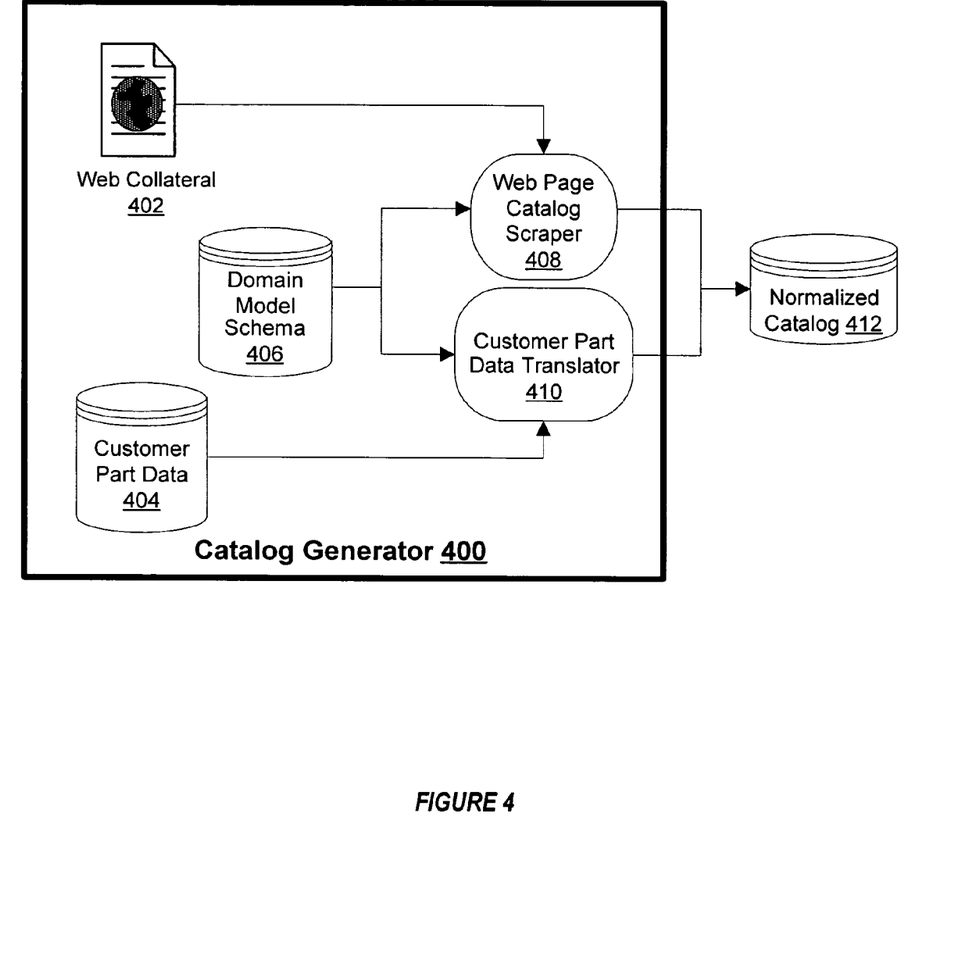
FIG. 4 depicts an exemplary method and system for generating a normalized catalog.

As described herein and depicted in the example of FIG. 4, the catalog generator 400 generates the normalized part catalog 412 which contains the part catalog, represented in the language defined by the domain model schema. The normalized part catalog 412 is used during the transformation operation to normalize the order history and recommendation context (e.g., the cart items, session history or other customer part data 402, 404). As noted earlier, domain model schema is likely different from configuration catalog schemas or schemas used to display product collateral, so that the attributes and attribute values are not necessarily the same. For example, a certain profile might be interested in high-performance systems that are defined in the context of the domain model in terms of processor speed and memory, but the native part catalog data (such as contained in the customer part data 404 or on the customer web site 402) may not represent the part in these terms. To reconcile this difference, the domain model schema 406 is used to map or transform the native part catalog information collected from the web site 402 by the web page catalog scraper 408 into a normalized part catalog 412. In a selected embodiment, the web page catalog scraper 408 infers attribute values, part groups and functions from product web pages, using a combination of pattern matching and inference and direct conversion from HTML text to domain model attribute values. For other structured formats, such as an alternate catalog schema, a translator 410 is used to transform the customer part data 404 into the domain model schema. The derivation techniques of scraping a catalog and translating customer parts differs from customer to customer and requires knowledge that persons of ordinary skill in the art (so-called experts) would possess.

In accordance with an illustrative embodiment of the present invention depicted in FIG. 1, a recommendation 50 generated by the recommendation system 10 may include a specific selling text and/or identified profile 46 that is provided to the recommendation engine 38 by the recommendation message generator 40. The recommendation message generator 40 may generate the profile/selling point text 46 using a profile selection process 44 to choose one of the profiles from the domain profile database 42 that best fits the recommendation context 16. However, the profile/selling point text 46 may also be generated based on the attribute value(s) associated with the recommendation context and/or candidate recommendation rule. By identifying the likely profile of the user and providing the identified profile 46 to the recommendation engine 38, the recommendation engine 38 can incorporate the user's goals and objectives in the recommendation message 50, thereby increasing the likelihood that the recommendation 50 will be accepted.

The generation of the recommendation messages starts with the domain profiles stored in the domain profile database 42. These profiles are used to represent user demographics or classes, and may include separate profiles for a variety of users, such as "Economy Buyer," "Power User," "Home Office," "Game Player," "Sophisticated User," "Technology Novice," and the like. Each profile in the database 42 may include an identification of goals and objectives typically associated with users fitting the profile. In addition and as explained more fully below, each profile in the domain profile database 42 may include a lead-in text, which describes the profile, a set of attributes (attributes-of-interest) that represent the product features that users take into account when making a purchase, and selling point text for each attribute-of-interest. The attributes-of-interest are those attributes that a member of the profile takes into consideration when deciding whether to purchase a product.

A profile selection process or algorithm 44 chooses or identifies one or more profiles from the domain profile database 42, based on the likelihood of matching the user profile indicated by the recommendation context 16. As part of the profile selection process, the profile selector 44 may provide a scoring functionality for scoring one or more domain profiles 42 in terms of the relative match to the recommendation context information. In a selected implementation, the profile scoring function ranks a given profile from the domain profile database 42 by using recommendation context data 16, such as click stream history and cart data, and the domain model schema 24 to generate a ranking value representing the likelihood that the given profile represents the recommendation context 16.

Profile selection may also be based on attribute-value matching, whereby the profiles are described by a set of attributes of interest, and each attribute of interest has a range of attribute values that define the attribute values that are consistent with the profile. Given a recommendation context, the profile is selected that encloses the attribute values of the parts in the recommendation context.

In addition, profile selection may be based on value functions, whereby a value function consisting of a weighted sum of the values of the attributes of interest is assigned to each profile. The weights represent the relative strength of the attribute towards defining the profile. The values of the attributes in the recommendation context are used in the value function to return a numeric value to each profile. The profile with the highest value is selected.

When more than one profile is selected by the profile selector 44, the selected domain profiles 42 may be weighted in terms of the matching probability with the recommendation context 16 by the profile selection process 44. With such a probabilistic approach, probabilities are assigned to profiles in the profile database 42, given an assignment of values to the attributes of interest. The attribute values of the parts in the recommendation context 16 are input, and the profile(s) with the highest probability are selected.

When a profile is selected by the profile selector 44, this profile contains an attribute or attribute-value selling point text which explains why the user should accept the recommendation using specific advantages with respect to the associated attribute or attribute value. Alternatively, selling point text 46 may include a plurality of texts, and the recommendation engine 38 uses the attribute(s) of the recommended item to select a text from the plurality of texts for inclusion in the recommendation 50. Thus, the recommendation text 46 can be based on the selected profile, and may include specific selling point text for certain attributes of the recommended item(s) which is used to inform the user why the recommended item is desirable or needed. The recommendation text 46 may also include a statement of intent or usage that represents the inferred profile of the user.

As an example, consider a "Digital Camera Novice" user profile. Users matching this profile are likely to be interested in an inexpensive camera (less than $300), with low resolution (2 MegaPixels or less), and are probably only interested in taking pictures and emailing those pictures to friends and family. The recommendation message generator 40 may act on these inferred interests of the "Digital Camera Novice" profile by detecting if the user has an inexpensive digital camera with low resolution in the recommendation context 16 and then identifying (such as by use of a lookup table) the user as a "Digital Camera Novice" with high probability. Based on such a selected profile 46, the recommendation engine 38 may be configured to avoid recommending digital image editing software to this type of user, and to instead recommend an inexpensive photo printer. An example of the resulting recommendation message 50 is set forth below:

Profile lead-in text—"Easily print digital photos for yourself, family, and friends."

Selling-point text—"Very economical", "Fast color photo print speed", and "Crisp and clear 3×5 photos."

On the other hand, if the recommendation context 16 indicates that the user has already selected an expensive, high resolution camera and a high-quality photo printer, then the recommendation message generator would be configured to issue a profile 46 identifying the user as a "Digital Photography Enthusiast." Based on this type of profile, the recommendation engine 38 could recommend digital image editing software to the user. The recommendation message 50 might look something like the following:

Profile lead-in text—"Take full advantage of your high quality digital camera images."

Selling-point text—"Edit, improve, and have fun with your digital images."

Figure 5:
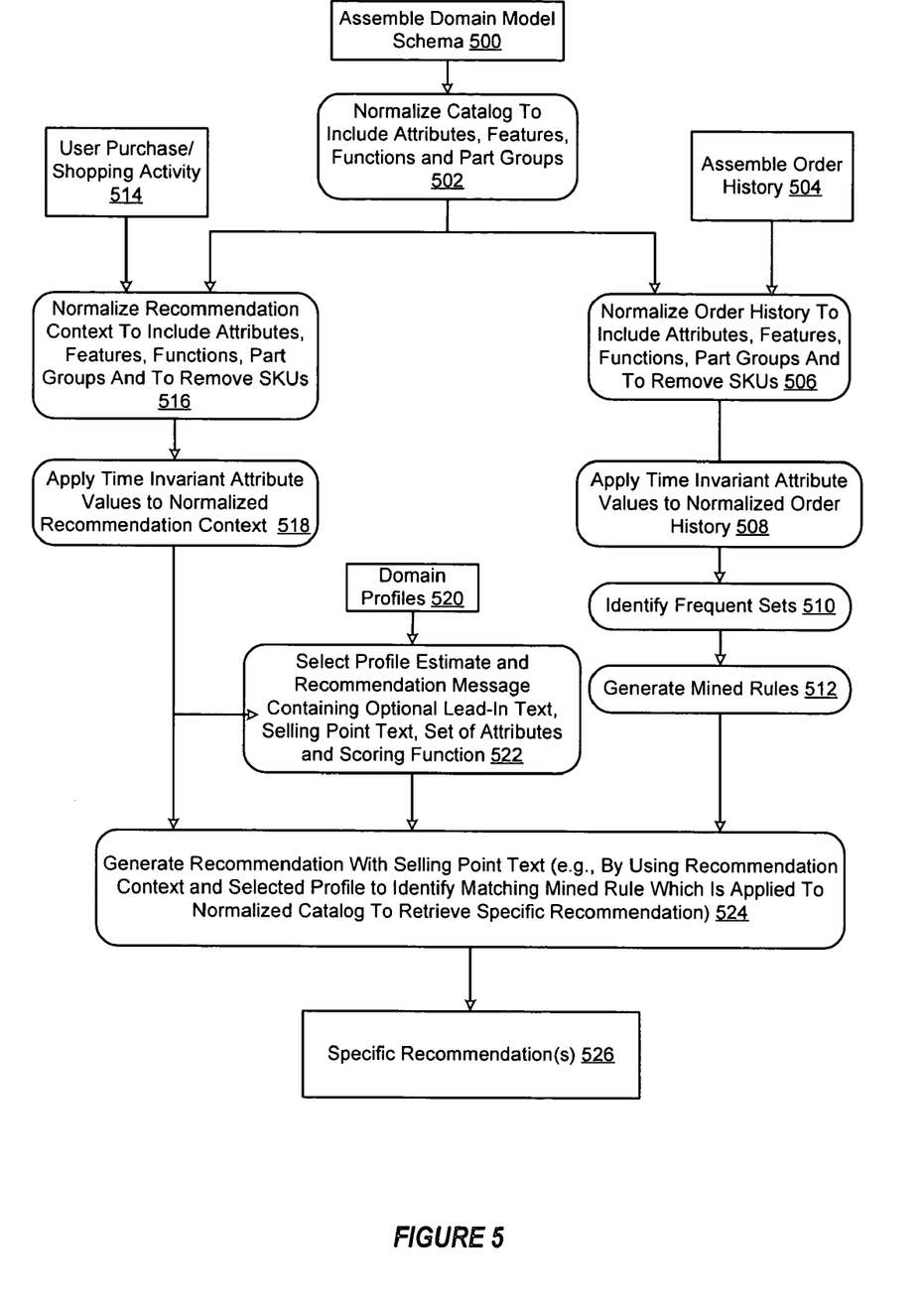
FIG. 5 shows a flowchart schematically illustrating the process for generating retail recommendations using a domain model representation of the customer order and order history information according to an illustrative embodiment of the present invention.

Turning now to FIG. 5, exemplary flow methodologies are illustrated for creating relevant and specific recommendations from a set of generated association rules using domain normalization techniques which allow detailed part correlations to be established while avoiding drawbacks associated with SKU churning. Though selected embodiments of how to generate recommendations are illustrated in FIG. 5, it will be appreciated by those of ordinary skill in the art that the sequence of illustrated steps may be modified, reduced or augmented in keeping with the disclosure of the present invention. For example, the step of applying time variant attribute values may optionally be included or excluded. In addition, the generation of mined rules can occur on a periodic basis, while the normalization of the recommendation context and selection of the profile and selling text can occur on a real time basis. Thus, it will be appreciated that the methodology of the present invention may be thought of as performing the identified sequence of steps in the order depicted in FIG. 5, though the steps may also be performed in parallel, in a different order, or as independent operations that normalize the catalog, order history and/or recommendation context and/or select user profile(s) and/or selling text in the course of generating one or more specific and relevant recommendations.

The description of the method can begin at step 500, where the domain model schema is assembled and stored in a database. While the mechanics of assembling a domain model schema can be accomplished by a variety of ways, at the end of the process, the domain model schema includes knowledge about a domain that a relative expert in the field would possess, including, but not limited to part groups, the attributes that describe the parts in the catalog, the functions that those parts perform, the relative performance and qualitative attribute values that describe the parts, and/or the industry standards and rules-of-thumb which constrain the possible recommendations. Persons of ordinary skill in the art will understand how to include this so-called expert knowledge into the domain model schema.

Once a domain model schema is assembled, the normalization process begins. As described herein, the normalization process uses the domain model schema to transformation the recommendation context, order history and/or catalog data into a normalized representation that is used by the analytics engine and recommendation engine. Starting with the catalog normalization process (step 502), it will be appreciated that any algorithm may be used to transform the native catalog data into a more detailed representation of the part(s) in terms of attributes, features, functions, and/or part groups may be used in connection with the present invention. In a selected embodiment, the catalog may be normalized by transforming generic item descriptors in the catalog database to provide more detailed item description information concerning various product attributes and/or qualities for the item. For example, part number information may be mapped into more granular product or attribute information identifying specific features of the product. In addition, the mapping function may transform the product information to include more general information for the product, such as a Part Group or other generalized identifier for the product. Each of the transformed descriptors may be treated as separate items for use with the data mining techniques described herein to provide improved pattern correlation based on the more specific attribute information contained in the transaction data.

Once the domain model schema and normalized catalog are assembled, the normalization of the order history and recommendation context may begin. Beginning with the order history normalization, the order history is assembled and stored in a database as a first data set (at step 504). While any algorithm may be used to transform the native order history into a more detailed representation of the part(s), in a selected embodiment, each item corresponding to an ordered part number is retrieved from the order history database and is transformed or mapped into attribute value pairs, features, functions, and/or part group items at step 506, thereby creating a second data set. In addition, the normalization process may remove part number information (such as SKUs) from the transformed data set. For a given order history, each retrieved part number and/or item in the transaction database is transformed until the mapping is complete.

As part of the normalization process or as an additional step 508, selected attribute values of the normalized order history may be (further) transformed into a time-variant representation, such as a qualitative value describing the relative performance of the product(s). In this way, the individual parts may be represented in qualitative terms, such as being "high" performance or "low" performance parts.

Because of the additional product detail information contained in the second data set (e.g., normalized transaction history), it can be used in transaction database applications to provide more meaningful frequent pattern analysis that is performed by the analytics engine. For example, once the second data set is complete, the normalized order history may be reviewed at step 510 to identify meaningful patterns (referred to as frequent patterns, frequent sets or frequent itemsets) in the normalized transaction database, such as significant purchase patterns that appear as common patterns recurring among a plurality of customers. Typically, this is done by using constraint thresholds such as support and confidence parameters, or other guides to the data mining process. These guides are used to discover frequent patterns, i.e., all sets of itemsets that have transaction support above a pre-determined minimum support S and confidence C threshold. Various techniques have been proposed to assist with identifying frequent patterns in transaction databases, including using "Apriori" algorithms to generate and test candidate sets, such as described by R. Agrawal et al., "Mining Association Rules Between Sets of Items in Large Databases," Proceedings of ACM SIGMOD Int'l Conf. on Management of Data, pp. 207-216 (1993). However, candidate set generation is costly in terms of computational resources consumed, especially when there are prolific patterns or long patterns in the database and when multiple passes through potentially large candidate sets are required. Other techniques (such as described by J. Han et al., "Mining Frequent Patterns Without Candidate Generation," Proceedings of ACM SIGMOD Int'l Conf. on Management of Data, pp. 1-12 (2000)) attempt to overcome these limitations by using a frequent pattern tree (FPTree) data structure to mine frequent patterns without candidate set generation (a process referred to as FPGrowth). With the FPGrowth approach, frequency pattern information is stored in a compact memory structure.

Once the frequent sets are identified, the association rules are generated at step 512. In an illustrative embodiment, the mined rules are generated by constructing the power set (set of all subsets) of the identified frequent sets, and then generating rules from each of the elements of the power set. As will be appreciated by those of ordinary skill in the art, frequent patterns or itemsets may be constructed using data mining techniques to find interesting patterns from databases, such as association rules, correlations, sequences, episodes, classifiers, clusters and the like. The task of discovering and storing all frequent patterns from a database of items is quite challenging, given that the search space is exponential in the number of items occurring in the database. A broad variety of efficient algorithms for mining association rules have been developed in recent years, including algorithms based on the level-wise Apriori framework and TreeProjection. In addition, FPTree and FPGrowth techniques may be used to generate association rules using a compact in-memory representation of the transaction database, such as described in U.S. patent application Ser. No. 10/870,360 entitled "Attribute Based Association Rule Mining," filed Jun. 17, 2004, and assigned to Trilogy Development Group, which is hereby incorporated by reference in its entirety. However, it is contemplated that other rule generation algorithms, including but not limited to an Apriori algorithm and its many variants, may also be used to generate rules in keeping with the present invention.

Once the mined rules have been generated, they may be used to provide purchase recommendations to a user who has provided an indication of potential purchase interest. Such an indication may be provided in a number of ways, including but not limited to browsing on a website, placing one or more items in the user's shopping cart, viewing a product page on the web, configuring a product online, clicking through a web site, purchasing one or more items, submitting an email address or request in connection with an advertising, promotional or service related query, or otherwise providing some indicia of commercial interest that might provide a recommendation context. Whatever user purchase or shopping activity is used to capture the recommendation context (step 514), the recommendation context is then transformed into a more detailed representation of the part(s) identified by the recommendation context at step 516. While any algorithm may be used to transform the data, in a selected embodiment, each item from the recommendation context is transformed or mapped into attribute value pairs, features, functions, and/or part group items at step 516, thereby creating a normalized transaction data set. In addition, the normalization process may remove part number information (such as SKUs) from the normalized transaction data set. For each item in the recommendation context, the part number is transformed until the mapping is complete.

As part of the normalization process or as an additional step 518, selected attribute values of the normalized transaction data set may be (further) transformed into a time-variant representation, such as a qualitative value describing the relative performance of the product(s). In this way, the individual parts may be represented in qualitative terms, such as being "high" performance or "low" performance parts.

As described herein, the recommendation process may be assisted by providing the recommendation engine with a profile estimate and associated recommendation message for the particular user associated with the recommendation context (step 522). The profile estimate may be selected from a database of domain profiles 520 at selection step 522, based on the normalized transaction data set. This recommendation message may (though need not necessarily) include lead-in text describing the profile, and/or specific selling point text. In a selected embodiment, the selling point text may be based on the recommended product or part attributes, but may also or alternatively be based on a profile estimate for the particular user associated with the recommendation context. The recommendation message may also include a statement of intent or usage for use in selecting from among the possible mined rules to recommend. In addition or in the alternative, the selected profile may include a set of attributes-of-interest representing the product features that users take into account when making a purchase. In addition, each selected profile may include a profile scoring function that is used to select the profile. With these inputs, the recommendation engine generates a recommendation (step 524) by, for example, using the recommendation context and selected profile to identify the matching mined rule(s). The matching rule may specify the specific part to be recommended, or may alternatively be applied to the normalized catalog to retrieve a specific recommendation (step 526).

In an exemplary embodiment, the system and method for efficiently generating association rules may be implemented with a data processing system that processes transaction database information to provide a normalized frequent set with attribute-based items identifying the purchased product, and to more efficiently generate association rules from the normalized frequent set. For example, data processing may be performed on computer system 210 which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 210 includes one or more microprocessor or central processing units (CPU) 212, mass storage memory 214 and local RAM memory 215. The processor 212, in one embodiment, is a 32-bit or 64-bit microprocessor manufactured by Motorola, such as the 680×0 processor or microprocessor manufactured by Intel, such as the 80×86, or Pentium processor, or IBM. However, any other suitable single or multiple microprocessors or microcomputers may be utilized. Computer programs and data are generally stored as instructions and data in mass storage 214 until loaded into main memory 215 for execution. Main memory 215 may be comprised of dynamic random access memory (DRAM). As will be appreciated by those skilled in the art, the CPU 212 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary skill in the art will recognize that the foregoing components and devices are used as examples for the sake of conceptual clarity and that various configuration modifications are common.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to improve the generation of attribute-based rules. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based data processing system described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method of generating recommendations for potential purchase by a customer, comprising:
    transforming a part catalog into a normalized part catalog by mapping at least one generic catalog item from the part catalog into a set of normalized catalog items based on attribute names and values corresponding to the generic catalog item;
    transforming a transaction history data set into a normalized transaction history data set with a computer system by mapping at least one generic item from the transaction history data set into a set of normalized items based on attribute names and values corresponding to the generic item;
    generating association rules based on the normalized transaction history data set;
    transforming a recommendation context into a normalized transaction data set by mapping at least one customer item from the recommendation context into a set of normalized transaction items based on attribute names and values corresponding to the customer item;
    generating a recommendation by selecting a rule from the association rules that best matches with the normalized transaction data set.

2. The method of claim 1, where each of the transforming steps uses a domain model schema to transform the part catalog, transaction history data set and recommendation context into a shared domain, where the domain model schema comprises part group descriptors, feature descriptors, function descriptors and/or attribute descriptors describing each sellable part in the shared domain.

3. The method of claim 1, where the transforming of the transaction history data set into the normalized transaction history data set uses a domain model schema comprising a set of attributes describing specific aspects of sellable parts in a shared domain, where the set of attributes are selected to reduce a dimensionality measure of the generated association rules.

4. The method of claim 1, where one or more of the transforming steps converts any SKU descriptor into at least one normalized attribute-based descriptor.

5. The method of claim 4, where the attribute-based descriptor comprises a qualitative descriptor.

6. The method of claim 4, where the attribute-based descriptor comprises a time-variant descriptor.

7. The method of claim 1, where a new item in the part catalog, transaction history data set or recommendation context that corresponds to an existing part group is translated to at least one attribute-based descriptor for the existing part group.

8. The method of claim 7, comprising comparing a part group for the new item to an existing part group.

9. The method of claim 1, comprising generating a recommendation message to accompany the recommendation by using the normalized transaction data set to select a selling point text based on at least one attribute contained in a selected association rule.

10. The method of claim 9, comprising:
    selecting a profile estimate from a plurality of profiles in response to the normalized transaction data set, where the profile estimate comprises a profile lead-in text portion and an attribute selling point text portion; and
    constructing the recommendation message from the profile lead-in text portion and the attribute selling point text portion.

11. The method of claim 1, where the generation of a recommendation comprises:
    scoring at least one recommendation message based upon how closely a profile associated with the recommendation message corresponds to the recommendation context;
    scoring at least one association rule based upon how closely the association rule corresponds to the recommendation context;
    selecting a recommendation message for inclusion with the recommendation based upon said scoring steps.

12. The method of claim 1, comprising generating a recommendation message by using a recommendation context to select a profile from a plurality of user profiles identifying use, goals, and/or objectives of a customer associated with the recommendation context, said selected profile comprising a recommendation message.

13. The method of claim 12, wherein the selected profile comprises a set of attributes representing attributes that a user of selected profile type would be interested in when making a purchase.

14. The method of claim 12, wherein the selection of the profile from the plurality of user profiles uses the domain model schema to score each user profile based upon how closely the user profile corresponds to the recommendation context.

15. The method of claim 12, wherein two or more profiles are selected from the plurality of user profiles by using at least one normalized transaction item to score each user profile based upon how closely each user profile corresponds to the recommendation context, thereby selecting at least two user profiles corresponding most closely to the recommendation context as said two or more profiles.

16. The method of claim 1, comprising generating a recommendation message that comprises a selling point text for an attribute or attribute value of a recommended item that explains why the recommendation should be accepted.

17. The method of claim 1, wherein the normalized part catalog is used to identify a specific recommended item in response to the generated recommendation.

18. The method of claim 1, wherein the transforming of the part catalog into a normalized part catalog comprises using a web page catalog scraper to extract attribute values, part descriptions and/or other part data from a web page.

19. The method of claim 1, wherein the transforming of the part catalog into a normalized part catalog comprises using a schema translator to transform a native catalog schema to the domain model schema.

20. A system for generating purchase recommendations for a customer, comprising:
 a database for storing a transaction history data set;
 means for transforming the transaction history data set into an attribute-based transaction history data set;
 means for generating association rules from the attribute-based transaction history data set;
 means for transforming a recommendation context generated by a customer into an attribute-based transaction data set; and
 a recommendation engine for generating a recommendation by selecting a rule from the association rules that best matches with the attribute-based transaction data set.

* * * * *